(12) United States Patent
Alexander et al.

(10) Patent No.: US 7,883,148 B2
(45) Date of Patent: Feb. 8, 2011

(54) ACTIVE MATERIAL HEAD RESTRAINT ASSEMBLY

(75) Inventors: Paul W. Alexander, Ypsilanti, MI (US); Alan L. Browne, Grosse Pointe, MI (US); Nancy L. Johnson, Northville, MI (US); James Y. Khoury, Macomb, MI (US); Michael G. Carpenter, Romeo, MI (US); Leigh A. Berger, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

(21) Appl. No.: 12/056,664

(22) Filed: Mar. 27, 2008

(65) Prior Publication Data

US 2008/0252113 A1 Oct. 16, 2008

Related U.S. Application Data

(60) Provisional application No. 60/911,315, filed on Apr. 12, 2007.

(51) Int. Cl.
*B60N 2/48* (2006.01)
(52) U.S. Cl. .................................. 297/216.12
(58) Field of Classification Search ............. 297/216.12
See application file for complete search history.

(56) References Cited

U.S. PATENT DOCUMENTS

| | | | |
|---|---|---|---|
| 6,082,817 A | 7/2000 | Muller | |
| 6,213,548 B1 | 4/2001 | Van Wynsberghe et al. | |
| 7,070,235 B2 | 7/2006 | Schilling et al. | |
| 7,293,829 B2 * | 11/2007 | Thiel et al. ............. | 297/216.12 |
| 7,344,191 B2 | 3/2008 | Schilling et al. | |
| 7,350,859 B2 | 4/2008 | Klukowski | |
| 7,448,677 B2 * | 11/2008 | Sakai et al. ............ | 297/216.12 |
| 7,448,678 B2 | 11/2008 | Browne et al. | |
| 7,556,313 B2 | 7/2009 | Browne et al. | |
| 7,581,792 B2 | 9/2009 | Saberan | |
| 7,594,697 B2 | 9/2009 | Browne et al. | |
| 7,611,196 B2 | 11/2009 | Terada et al. | |
| 7,618,091 B2 | 11/2009 | Akaike et al. | |
| 2006/0226688 A1 | 10/2006 | Terada et al. | |
| 2007/0085400 A1 | 4/2007 | Terada et al. | |
| 2009/0062989 A1 * | 3/2009 | Sakai et al. ............ | 297/216.12 |

FOREIGN PATENT DOCUMENTS

| | | |
|---|---|---|
| DE | 4419350 A1 | 12/1995 |
| DE | 19951966 A1 | 10/1999 |
| EP | 1645460 A1 | 4/2006 |
| WO | 2007056640 A2 | 5/2007 |

* cited by examiner

*Primary Examiner*—Anthony D Barfield
(74) *Attorney, Agent, or Firm*—Quinn Law Group, PLLC

(57) ABSTRACT

A head restraint assembly includes a support member and a deployable member selectively movable between a retracted position and a deployed position. At least a portion of the deployable member is farther from the support member in the deployed than in the retracted position. A latch system is configured to releasably retain the deployable member in its retracted position. An active material member is actuatable to release the latch system, to release the deployable member.

21 Claims, 12 Drawing Sheets

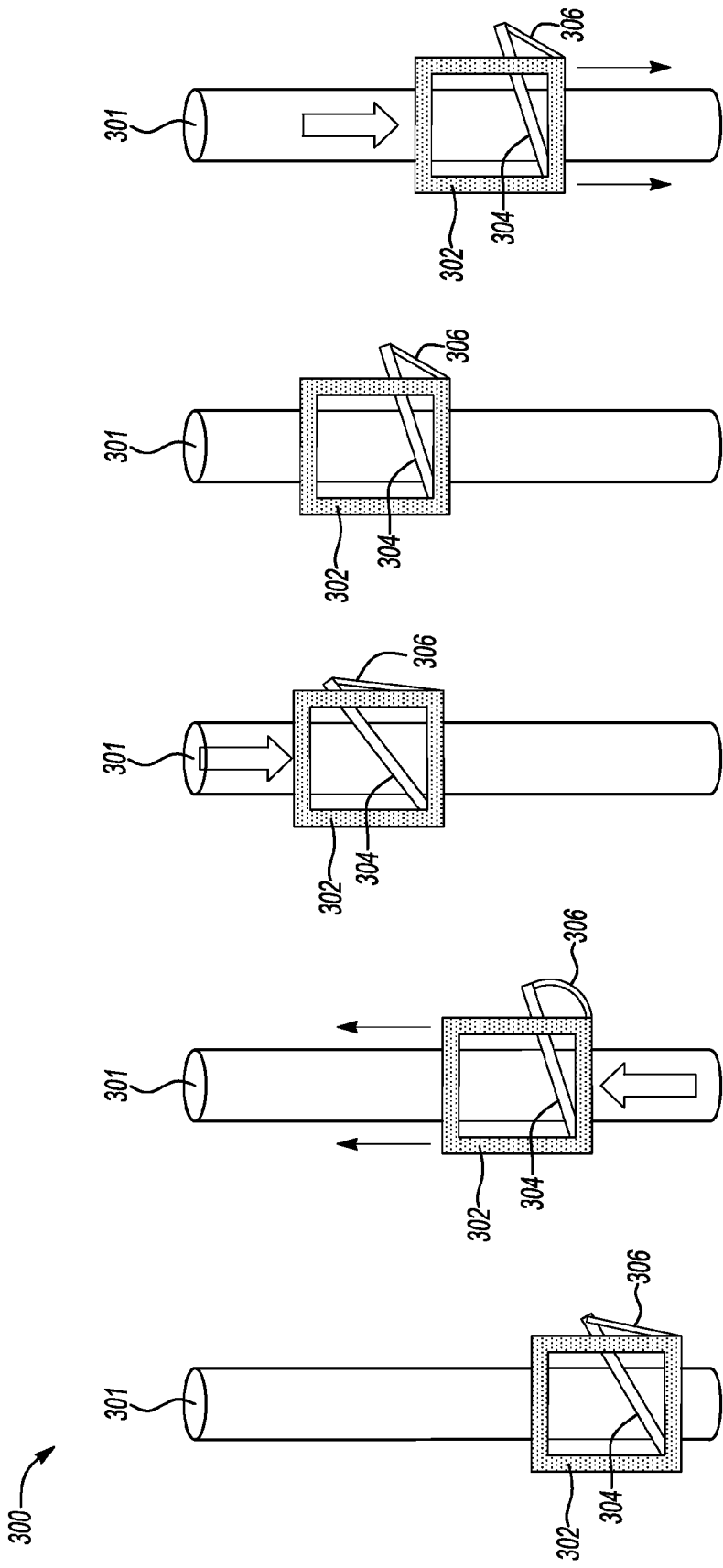

US 7,883,148 B2

ACTIVE MATERIAL HEAD RESTRAINT ASSEMBLY

CROSS REFERENCE TO RELATED APPLICATION

This application claims the benefit of U.S. Provisional Patent Application No. 60/911,315, filed Apr. 12, 2007, and which is hereby incorporated by reference in its entirety.

TECHNICAL FIELD

The invention relates to a head restraint assembly in automotive vehicles, and more particularly to latching and deployment of the head restraint assembly using an active material member.

BACKGROUND OF THE INVENTION

Head restraint assemblies are commonly employed in vehicles and are typically adjustably attached to the seatback. The head restraint is in alignment with the back of a seated occupant's head to provide comfort, support, and protection during operation of the vehicle. The padded portion of the head restraint that is adapted to provide the support and protection is typically positioned by the end-user.

Occupants of a vehicle tend to position their seat backs at different angles for comfort. For example, vehicle occupants tend to sit more upright in vehicles with higher seating heights such as vans and sport utility vehicles whereas in passenger cars the occupants tend to be in a more reclined position. The changes in seat back position can move the attached head restraint further or closer to the head of the seated occupant. That is, the space between an occupant's head and the head restraint can be affected and altered by the seat back position.

SUMMARY OF THE INVENTION

In some situations it may be desirable for the head restraint to be close to or touching the back of the occupant's head. During vehicle use it may be desirable to adjust the head restraint assembly from a position selected based upon comfort to a position that is based upon support for the occupant.

A head restraint assembly includes a support member and a deployable member selectively movable between a retracted position and a deployed position. At least a portion of the deployable member is farther from the support member in the deployed than in the retracted position.

A latch system is configured to releasably retain the deployable member in its retracted position. An active material member is actuatable to do at least one of releasing a latch system, releasing the deployable member and causing movement of the deployable member from its retracted position to its deployed position.

One embodiment of a head restraint assembly uses a clutch assembly operatively interconnecting the support member and the deployable member. In a first mode of operation the clutch permits movement of the deployable member toward its deployed position and prevents movement of the deployable member toward its retracted position. In a second mode of operation the clutch permits movement of the deployable member toward its retracted position. An active material member is actuatable to cause the clutch to operate in its second mode of operation.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 15 is a schematic illustration of an alternative clutch assembly used in the head restraint assembly of FIGS. 2-9A in a nominal position;

FIG. 16 is a schematic illustration of the clutch assembly of FIG. 15 used in the head restraint assembly of FIG. 2-9A in an upwardly driven second position;

FIG. 17 is a schematic illustration of the clutch assembly of FIG. 15 used in the head restraint assembly of FIGS. 2-9A in a locked third position;

FIG. 18 is a schematic illustration of the clutch assembly of FIG. 15 used in the head restraint assembly of FIGS. 2-9A in a disengaged fourth position; and FIG. 19 is a schematic illustration of the clutch assembly of FIG. 15 used in the head restraint assembly of FIGS. 2-9A in a downwardly driven fifth position.

DESCRIPTION OF THE PREFERRED EMBODIMENTS

Figure 1:
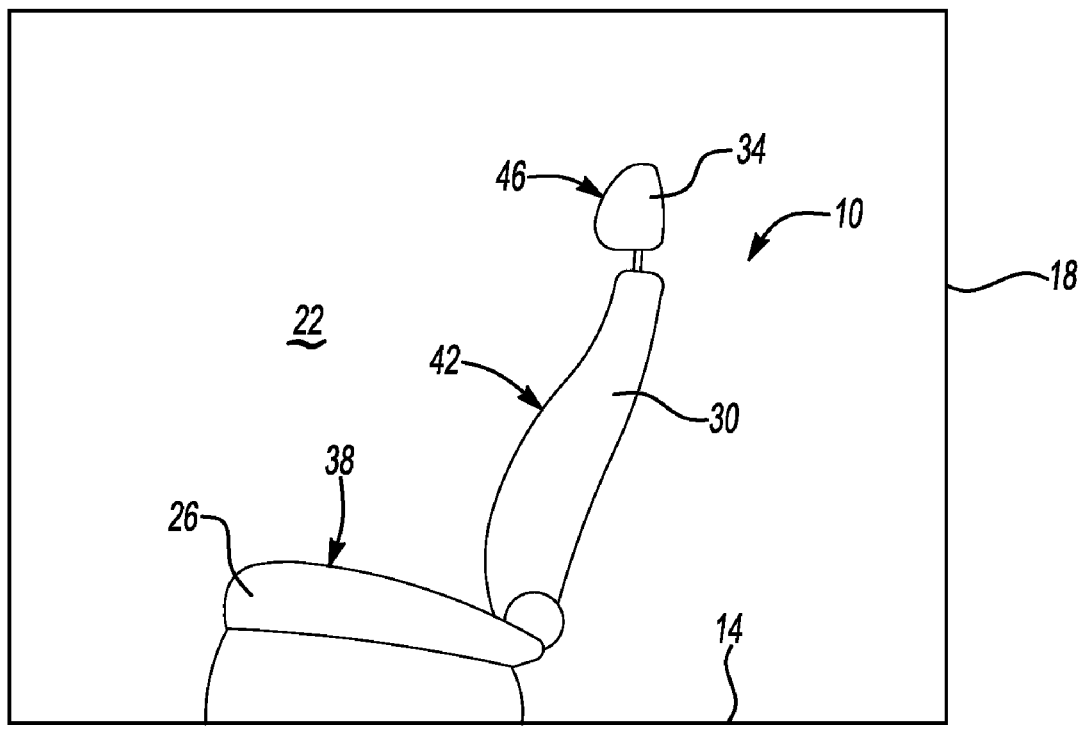
FIG. 1 is a schematic illustration of a passenger compartment having a seat assembly with a head restraint assembly.

Referring to the drawings, wherein like reference numbers refer to like components, FIG. 1 schematically depicts, a seat assembly 10 mounted to the floor 14 of a vehicle body 18. The vehicle body 18 defines a passenger compartment 22 in which the seat assembly 10 is disposed. The seat assembly 10 includes a lower seat portion 26, a seatback portion 30, and a head restraint assembly 34. The lower seat portion 26 defines a generally horizontally-oriented surface 38 for supporting an occupant (not shown). The seatback portion 30 is mounted with respect to the lower seat portion 26, and defines surface 42 for supporting the back of the occupant. The seatback portion 30 may be rigidly mounted with respect to the lower seat portion 26, or may be rotatably mounted with respect to the lower seat portion 26 so that the reclination angle is selectively variable by the occupant.

The head restraint assembly 34 is mounted to the upper end of the seatback portion 30. The head restraint assembly 34 is depicted as a separate member from the seatback portion; however, it should be noted that, within the scope of the claimed invention, a head restraint assembly may be an integral part of a seatback portion as understood by those skilled in the art. For example, a head restraint assembly may be the upper portion of a seatback. The head restraint assembly 34 defines a surface 46 that faces generally the same direction as surface 42.

Figure 2:
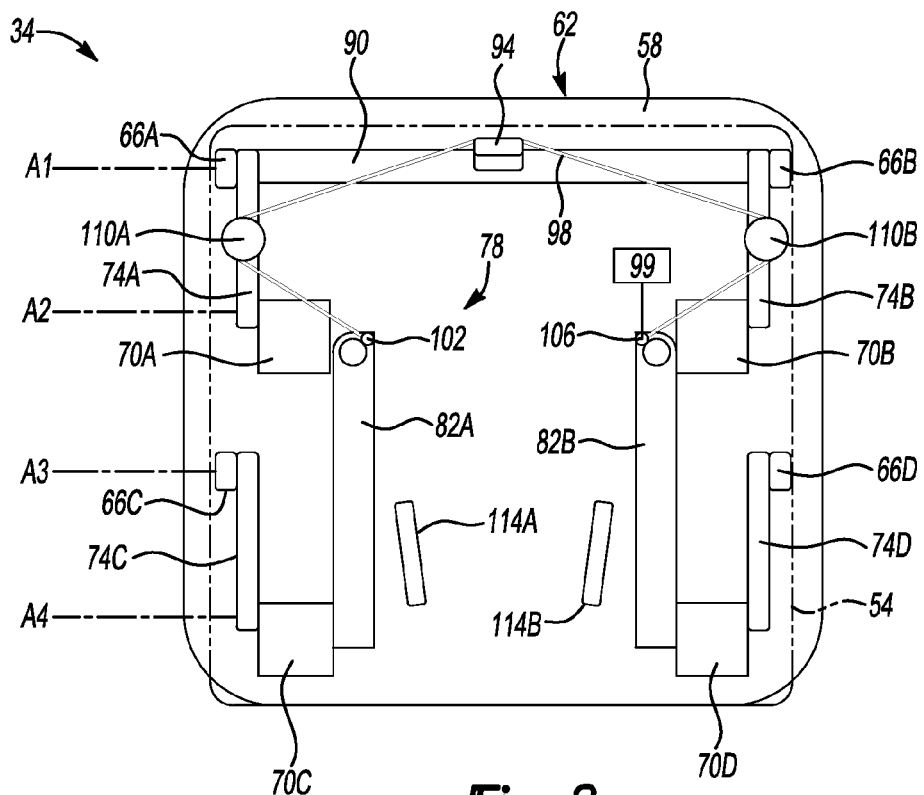
FIG. 2 is a rear schematic view of the head restraint assembly of FIG. 1 in a restrained and latched position.
Figure 2A:
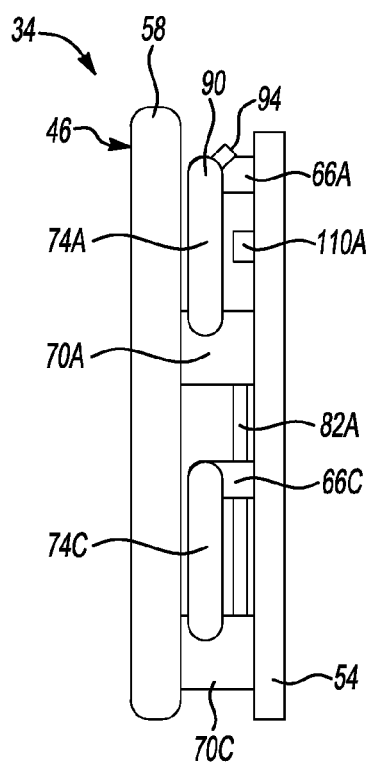
FIG. 2A is a side schematic view of the head restraint assembly of FIGS. 1 and 2 in the restrained and latched position.

Referring to FIGS. 2 and 2A, head restraint assembly 34 includes a support member, such as plate 54, that is mounted with respect to the seatback portion (shown at 30 in FIG. 1), and a padded member 58 that defines surface 46. The padded member 58, also referred to herein as a deployable member, is operatively connected to the plate 54 by an actuator assembly 62 that is configured to selectively move the padded member 58 with respect to the plate 54. The actuator assembly 62 includes four brackets 66A-D mounted to the plate 54, and four brackets 70A-D mounted to the padded member 58. Four links 74A-D operatively interconnect the plate 54 and the padded member 58. It should be noted that padded member 58 is exemplary; member 58 selectively moves the surface 46 of the head restraint assembly 34 and may have other configurations within the scope of the claimed invention. Surface 46 may be formed by an elastic membrane operatively connected to a member 58, etc.

More specifically, link 74A is rotatably connected to the bracket 66A at one end for rotation with respect to the plate 54 about axis A1, and link 74A is rotatably connected to the bracket 70A at the other end for rotation with respect to the padded member 58 about axis A2; link 74B is rotatably connected to the bracket 66B at one end for rotation with respect to the plate 54 about axis A1, and link 74B is rotatably connected to the bracket 70B at the other end for rotation with respect to the padded member 58 about axis A2; link 74C is rotatably connected to the bracket 66C at one end for rotation with respect to the plate 54 about axis A3, and is rotatably connected to the bracket 70C at the other end for rotation with respect to the padded member 58 about axis A4; and link 74D is rotatably connected to the bracket 66D at one end for rotation with respect to the plate 54 about axis A3, and is rotatably connected to the bracket 70D at the other end for rotation with respect to the padded member 58 about axis A4. Axes A1, A2, A3, A4 are parallel.

Links 74A and 74B are the same length and orientation as one another, and links 74C and 74D are the same length and orientation as one another. If all four links 74A-D have the same length and orientation, the linkage is a parallel mechanism, which ensures that the front surface 46 maintains the same angular orientation with respect to an occupant throughout deployment. The relative lengths and orientations of the link pairs 74A,B and 74C,D can be altered so that the angular orientation of the front surface 46 will change during deployment. This allows design flexibility where the head restraint can change position and orientation during deployment so that the front surface 46 is at a different orientation after deployment than it was in its nominal position, for aesthetic, comfort, and/or other reasons.

Figure 3:
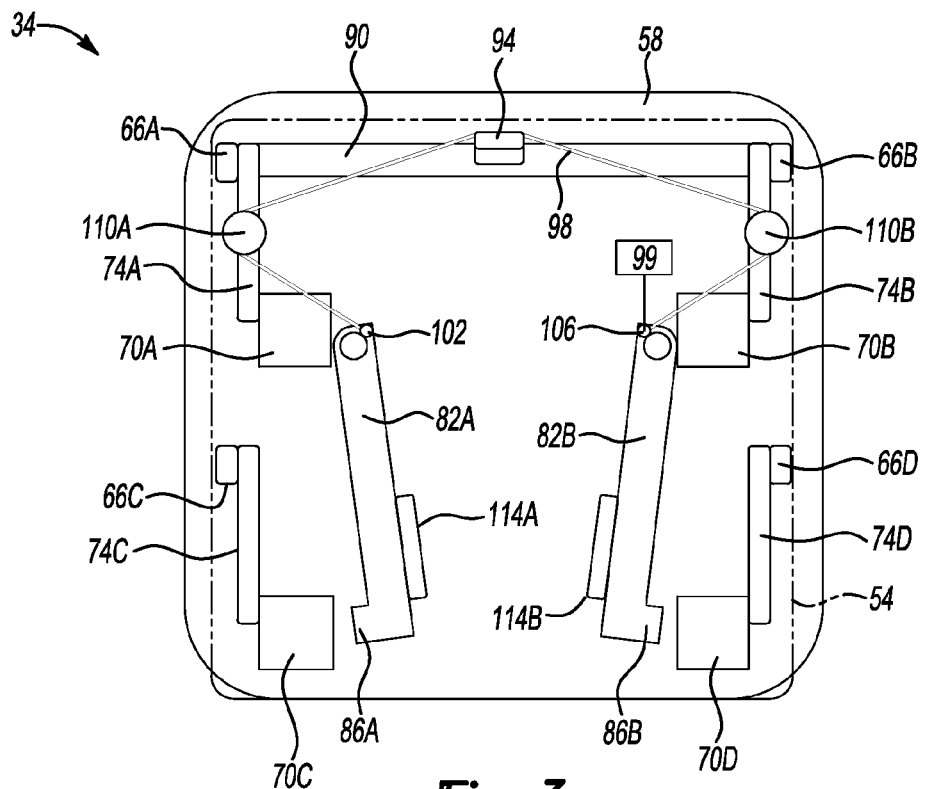
FIG. 3 is a rear schematic view of the head restraint assembly of FIGS. 1-2A in a restrained and unlatched position.
Figure 4:
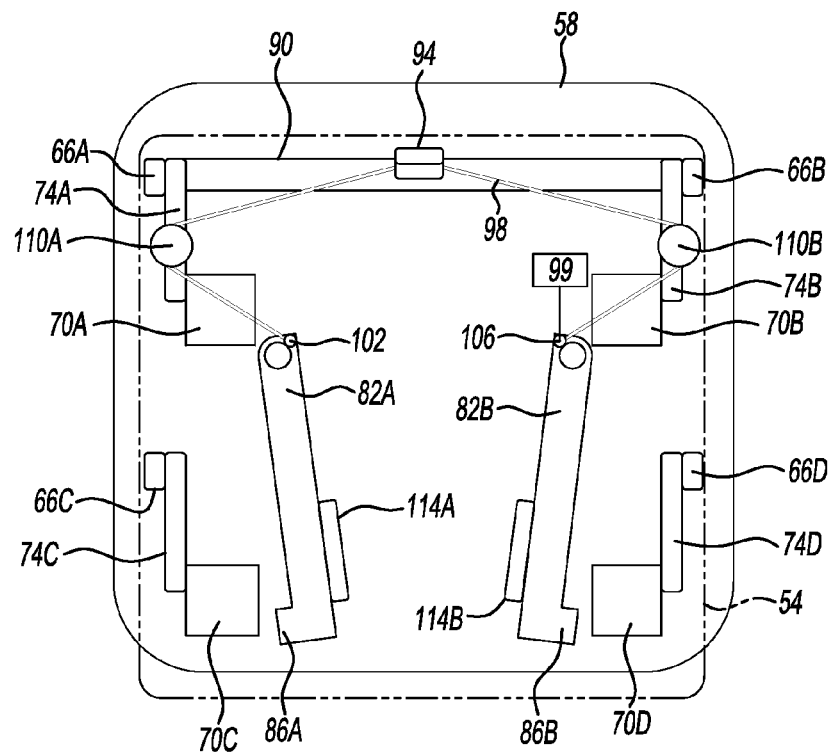
FIG. 4 is a rear schematic view of the head restraint assembly of FIGS. 1-3A in a partially deployed position.
Figure 5:
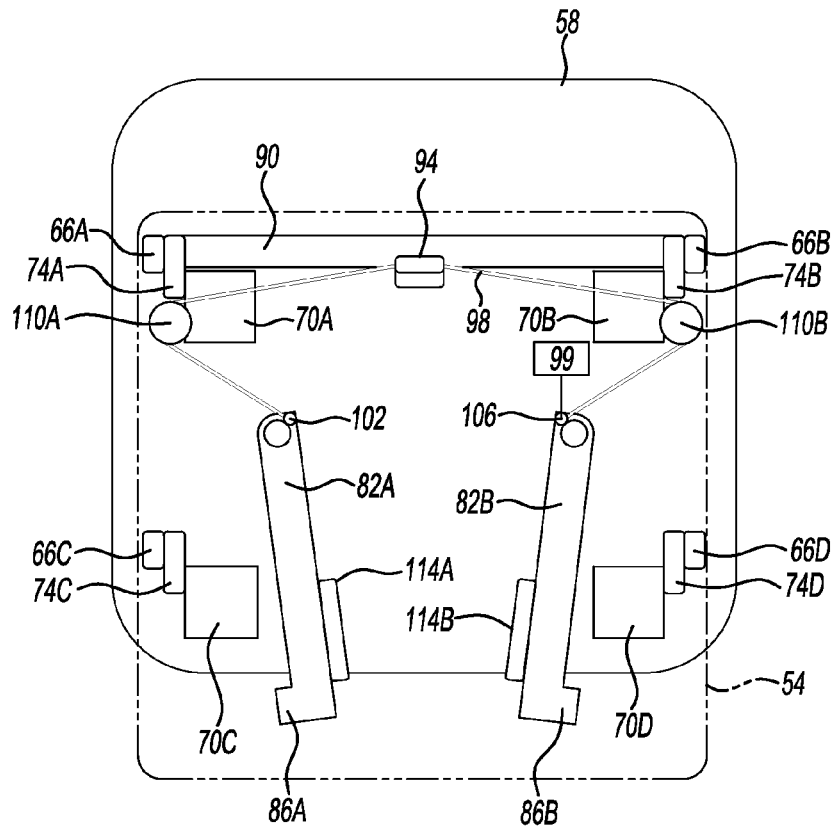
FIG. 5 is a rear schematic view of the head restraint assembly of FIGS. 1-4A in a fully deployed position.

The padded member 58 is depicted in a first position, i.e. a retracted position, with respect to the plate 54 in FIGS. 2 and 2A. When the padded member 58 is in the first position, links 74A-C are generally vertically oriented such that the brackets 70A-D abut the plate 54. A latching system 78 releasably retains the padded member 58 in its first position. The latching system 78 includes two L-shaped pawls 82A, 82B that are pivotably connected to the plate 54, and that are selectively pivotable between respective latched positions, as shown in FIG. 2, and respective released positions, as shown in FIGS. 3-5. When pawl 82A is in its latched position, a segment (shown at 86A in FIG. 3) is within a slot (not shown) in bracket 70C such that bracket 70C is retained in abutment with the plate 54. Similarly, when pawl 82B is in its latched position, a segment (shown at 86B in FIG. 3) is within a slot (not shown) in bracket 70D such that bracket 70D is retained in abutment with the plate 54. Accordingly, pawls 82A, 82B retain the padded member 58, to which brackets 70C, 70D are mounted, in its first position. Springs (not shown) bias the pawls 82A, 82B into their respective latched positions.

The actuator assembly 62 further includes a shaft 90 that is mounted to the links 74A, 74B for rotation therewith about axis A1. Shaft 90 is generally cylindrical and is characterized by a lip 94 that protrudes radially therefrom. The actuator assembly 62 also includes a shape memory alloy (SMA) wire 98 characterized by a first end 102 and a second end 106. The first end 102 of the SMA wire 98 is mounted to pawl 82A, and the second end 106 of the SMA wire 98 is mounted to pawl 82B. The SMA wire 98 is also engaged with lip 94, and two pulleys 110A, 110B that are mounted to the plate 54. The pulleys 110A, 110B are positioned such that ends 102, 106 urge the pawls 82A, 82B into their respective unlatched positions when the SMA wire 98 is activated.

A shape memory alloy is characterized by a cold state, i.e., when the temperature of the alloy is below its martensite finish temperature $M_f$. A shape memory alloy is also characterized by a hot state, i.e., when the temperature of the alloy is above its austenite finish temperature $A_f$. An object formed of the alloy may be characterized by a predetermined shape. When the object is pseudo-plastically deformed in the cold state, the strain may be reversed by heating the object above its austenite finish temperature $A_f$, i.e., heating the object above its $A_f$ will cause the object to return to its predetermined shape as the material changes phase from Martensite to Austenite. A SMA's modulus of elasticity and yield strength are also significantly lower in the cold state than in the hot state. As understood by those skilled in the art, pseudo-plastic strain is similar to plastic strain in that the strain persists despite removal of the stress that caused the strain. However, unlike plastic strain, pseudo-plastic strain is reversible when the object is heated to its hot state.

The SMA wire 98 is characterized by a predetermined length (shape), and is configured such that it is characterized by tensile strain when the pawls 82A, 82B are in their latched positions, and is thus longer than its predetermined length. An activation device 99 is connected to the wire 98 to apply an activation signal to the wire 98. When the wire 98 is heated to the hot state, it decreases in length to its predetermined length, thereby causing the pawls 82A, 82B to rotate with respect to the plate 54 to their respective unlatched positions, as shown in FIGS. 3 and 3A.

Figure 3A:
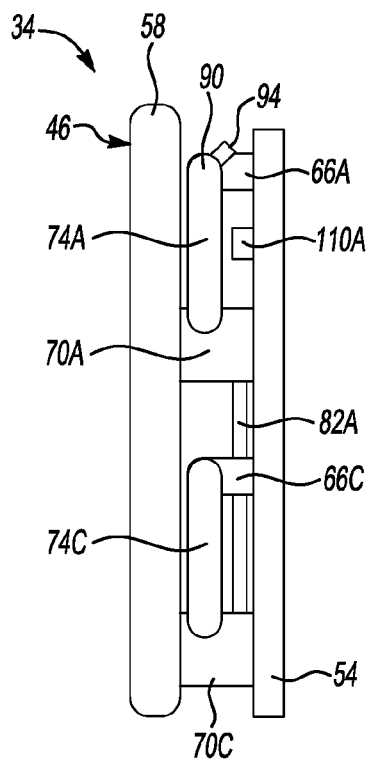
FIG. 3A is a side schematic view of the head restraint assembly of FIGS. 1-3 in the restrained and unlatched position.
Figure 4A:
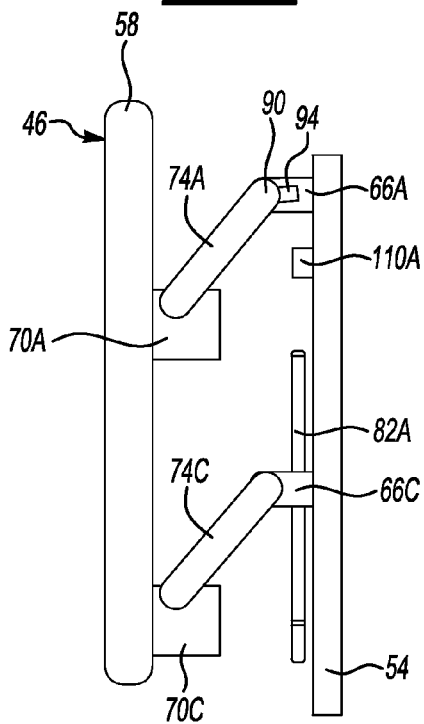
FIG. 4A is a side schematic view of the head restraint assembly of FIGS. 1-4 in the partially deployed position.
Figure 5A:
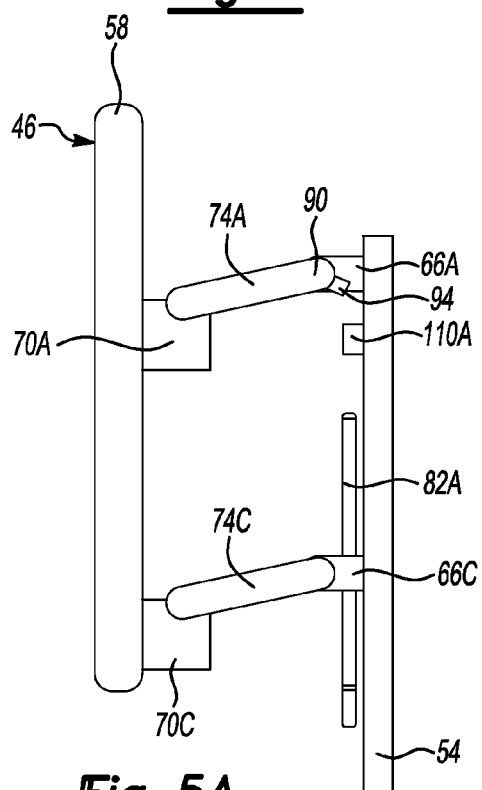
FIG. 5A is a side schematic view of the head restraint assembly of FIGS. 1-5 in the fully deployed position.

FIGS. 3 and 3A depict an intermediate configuration of the head restraint assembly in which the SMA wire 98 has decreased in length sufficiently to rotate the pawls 82A, 82B to their respective unlatched positions so that the pawls 82A, 82B do not restrict movement of the brackets 70C, 70D, and, correspondingly, the padded member 58. Members 114A, 114B are mounted to the plate 54, and are sufficiently positioned to cause physical part interference with the pawls 82A, 82B to prevent rotation of the pawls 82A, 82B beyond their unlatched positions. The SMA wire 98 continues to decrease in length toward its predetermined length; with the rotation of the pawls 82A, 82B prevented by members 114A, 114B, the SMA wire 98 exerts sufficient force on the lip 94 to cause rotation of the shaft 90, and, therefore, links 74A, 74B, about axis A1, as shown in FIGS. 4 and 4A. Referring to FIGS. 4 and 4A, as the links 74A, 74B rotate about axis A1, they cause the padded member 58 to move away from the plate 54. The movement of the padded member 58 as a result of the rotation of links 74A, 74B in turn causes the rotation of links 74C, 74D. Referring to FIGS. 5 and 5A, when the SMA wire 98 is its predetermined length, the padded member 58 is in a second position with respect to the plate 54, in which the padded member 58 is extended forward in the vehicle body and closer to an occupant than in the first position.

Figure 6:
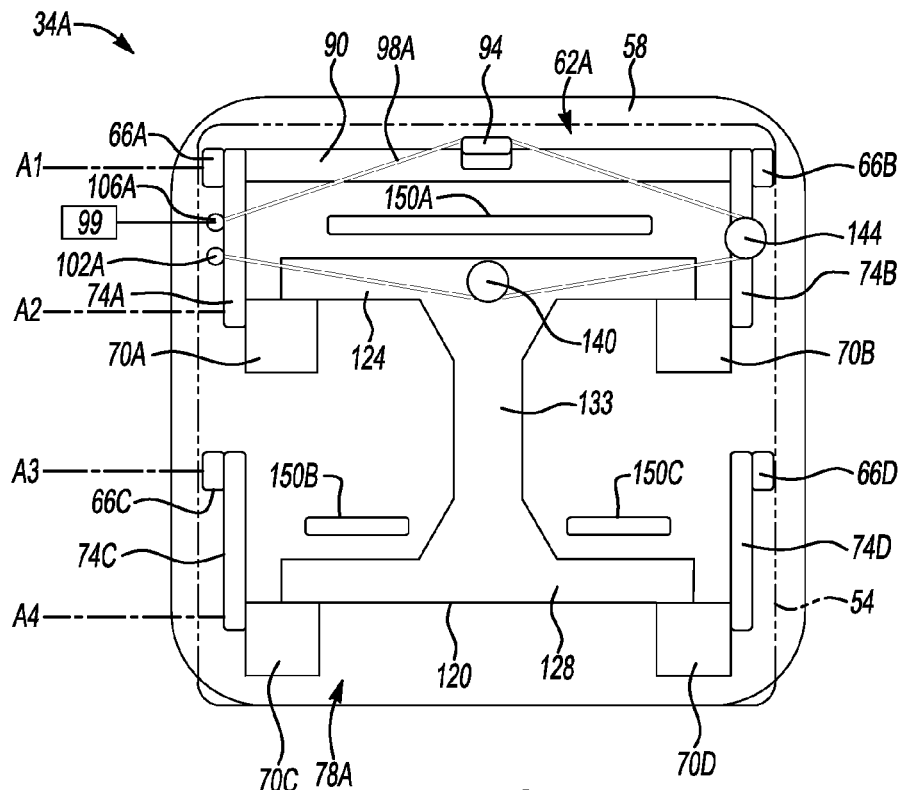
FIG. 6 is a side schematic view of another embodiment of the head restraint assembly of FIG. 1 in a restrained and latched position.
Figure 6A:
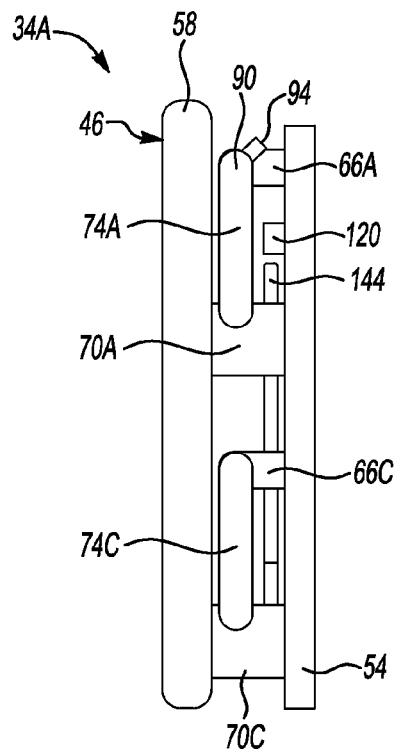
FIG. 6A is a side schematic view of the head restraint assembly of FIG. 6 in the restrained and latched position.

Referring to FIGS. 6 and 6A, an alternative head restraint assembly 34A is schematically depicted. Head restraint assembly 34A includes a plate 54 that is mounted with respect to the seatback portion (shown at 30 in FIG. 1), and a padded member 58 that defines surface 46. The padded member 58 is operatively connected to the plate 54 by an actuator assembly 62A that is configured to selectively move the padded member 58 with respect to the plate 54. The actuator assembly 62A includes four brackets 66A-D mounted to the plate 54, and four brackets 70A-D mounted to the padded member 58. Four links 74A-D operatively interconnect the plate 54 and the padded member 58.

More specifically, link 74A is rotatably connected to the bracket 66A at one end for rotation with respect to the plate 54 about axis A1, and link 74A is rotatably connected to the bracket 70A at the other end for rotation with respect to the padded member 58 about axis A2; link 74B is rotatably connected to the bracket 66B at one end for rotation with respect to the plate 54 about axis A1, and link 74B is rotatably connected to the bracket 70B at the other end for rotation with respect to the padded member 58 about axis A2; link 74C is rotatably connected to the bracket 66C at one end for rotation with respect to the plate 54 about axis A3, and is rotatably connected to the bracket 70C at the other end for rotation with respect to the padded member 58 about axis A4; and link 74D is rotatably connected to the bracket 66D at one end for rotation with respect to the plate 54 about axis A3, and is rotatably connected to the bracket 70D at the other end for rotation with respect to the padded member 58 about axis A4. Axes A1, A2, A3, A4 are parallel.

The padded member 58 is depicted in a first position with respect to the plate 54 in FIGS. 6 and 6A. When the padded member 58 is in the first position, links 74A-C are generally vertically oriented such that the brackets 70A-D abut the plate 54. A latching system 78A releasably retains the padded member 58 in its first position. The latching system 78 includes a member 120 having two parallel segments 124, 128 that are spaced a distance apart from one another and that are connected by segment 133. The member 120 also includes segments (shown at 132A-D in FIG. 7) that protrude from segments 124 and 128. Each bracket 70A-D defines a respective slot (not shown).

The member 120 is movably mounted to the plate 54 and is selectively translatable between a latched position and an unlatched position. When member 120 is in the latched position, as shown in FIG. 6, each of the segments shown at 132A-D in FIG. 7 extends into a respective one of the slots defined by brackets 70A-D such that the brackets 70A-D are retained in abutment with the plate 54. Accordingly, member 120 retains the padded member 58, to which brackets 70A-D are mounted, in its first position. A spring (not shown) biases the member 120 in its latched position.

The actuator assembly 62A further includes a shaft 90 that is mounted to the links 74A, 74B for rotation therewith about axis A1. Shaft 90 is generally cylindrical and is characterized by a lip 94 that protrudes radially therefrom. The actuator assembly 62A also includes a shape memory alloy (SMA) wire 98A that is mounted with respect to the plate 54 at one end 102A, engages a protrusion 140 on the member 120, engages a pulley 144 that is mounted to plate 54, engages lip 94, and is mounted at the other end 106A to the plate 54 adjacent to end 102A.

The SMA wire 98A is characterized by a predetermined length (shape), and is configured such that it is characterized by tensile strain when the member 120 is in its latched position, and is thus longer than its predetermined length. When the wire 98A is heated to the hot state, it decreases in length to its predetermined length, thereby urging protrusion 140 and lip 94 toward one another.

Figure 7:
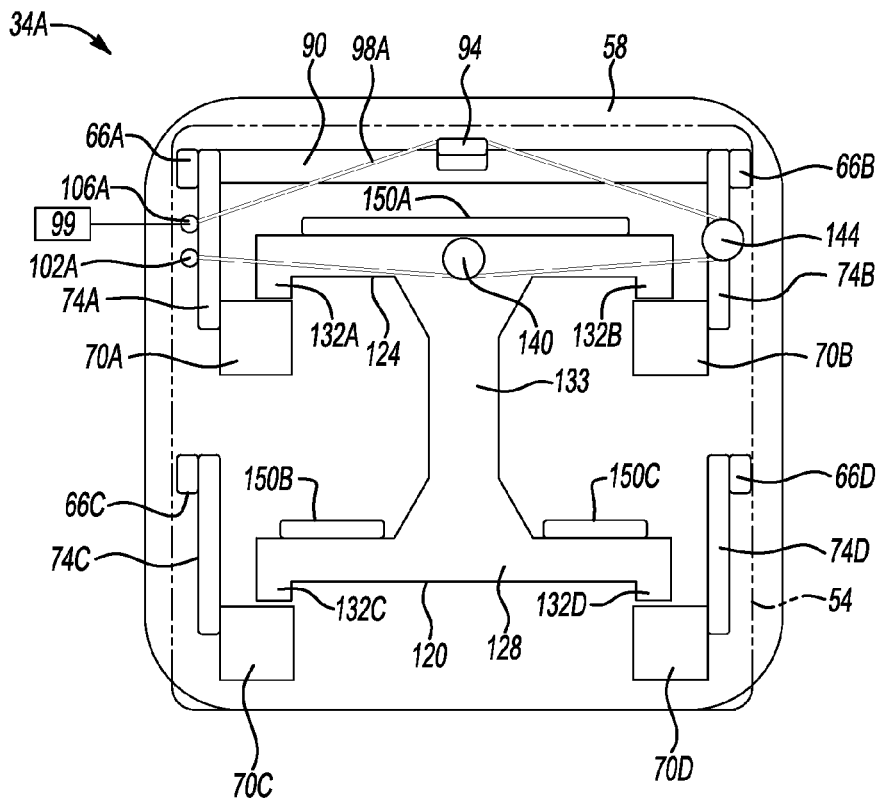
FIG. 7 is a rear schematic view of the head restraint assembly of FIGS. 6 and 6A in a restrained and unlatched position.
Figure 7A:
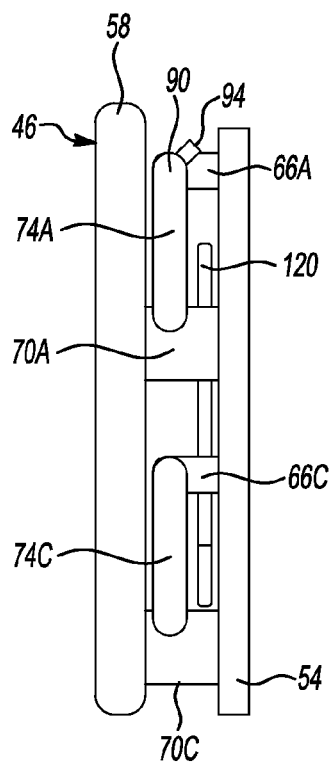
FIG. 7A is a side schematic view of the head restraint assembly of FIGS. 6-7 in the restrained and unlatched position.

FIGS. 7 and 7A depict an intermediate configuration of the head restraint assembly 34A in which the SMA wire 98A has decreased in length sufficiently to move the member 120 to its unlatched position so that the segments 132A-D are removed from the slots defined by brackets 70A-D. Members 150A, 150B, 150C are mounted to the plate 54 and are sufficiently positioned to cause physical part interference with the member 120 to prevent movement of the member 120 beyond its unlatched position. The SMA wire 98A continues to decrease in length toward its predetermined length; with the movement of the member 120 prevented by members 150A-C, the SMA wire 98A exerts sufficient force on the lip 94 to cause rotation of the shaft 90, and, therefore, links 74A, 74B, about axis A1, as shown in FIGS. 8 and 8A.

Figure 8:
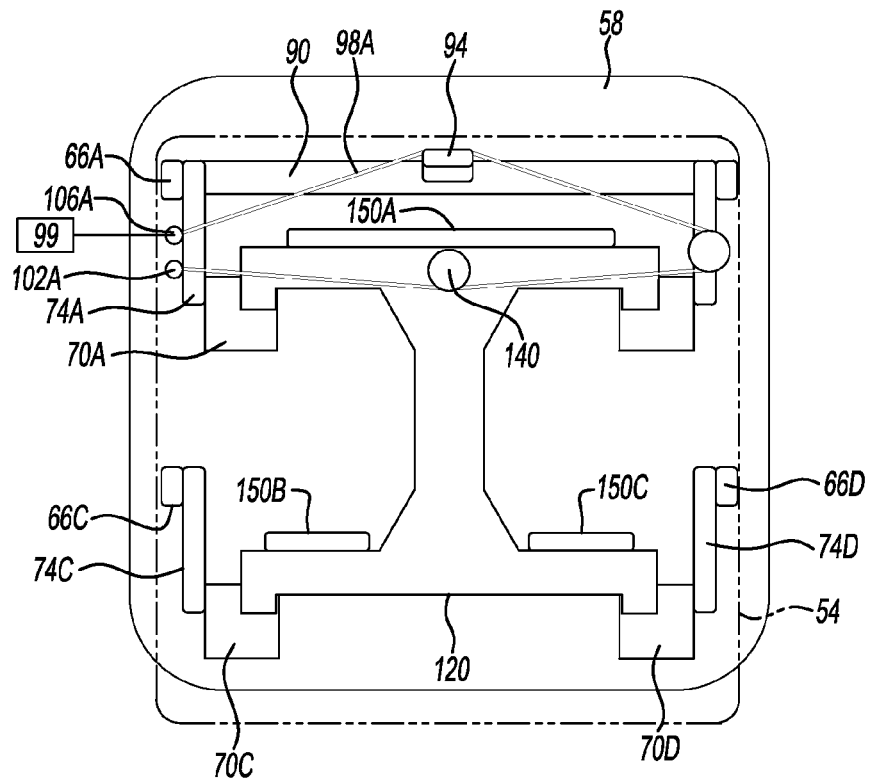
FIG. 8 is a rear schematic view of the head restraint assembly of FIGS. 6-7A in a partially deployed position.
Figure 8A:
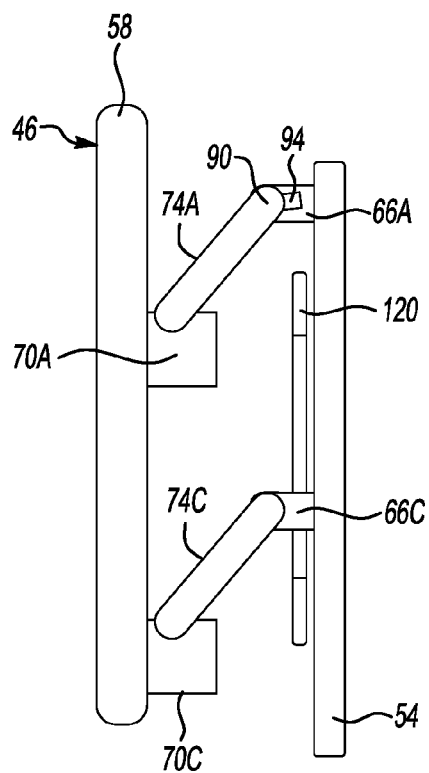
FIG. 8A is a side schematic view of the head restraint assembly of FIGS. 6-8 in the partially deployed position.
Figure 9:
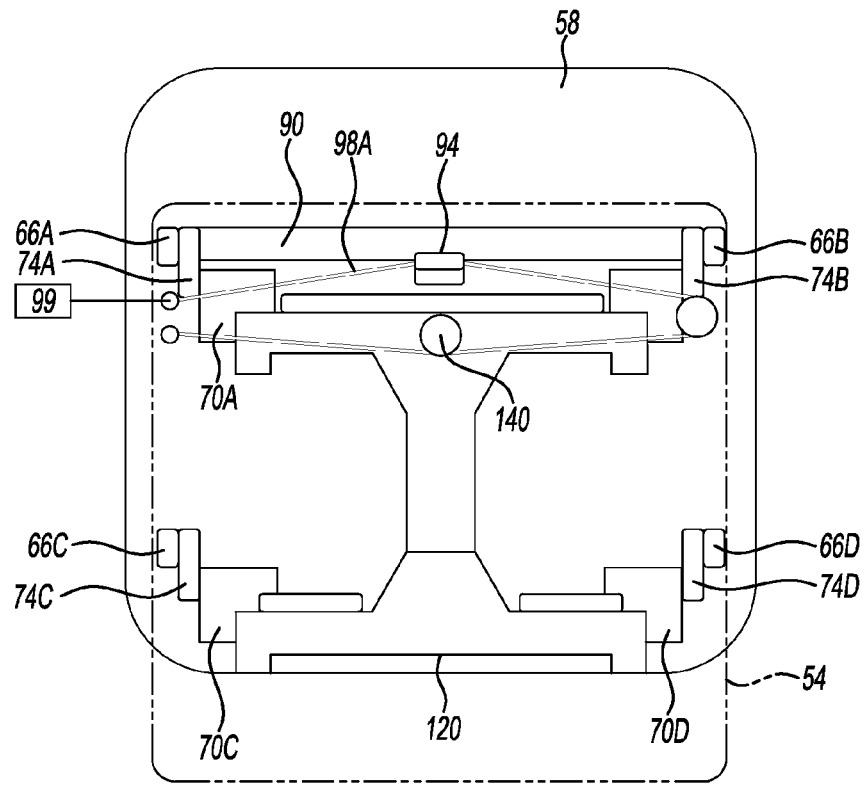
FIG. 9 is a rear schematic view of the head restraint assembly of FIGS. 6-8A in a fully deployed position.
Figure 9A:
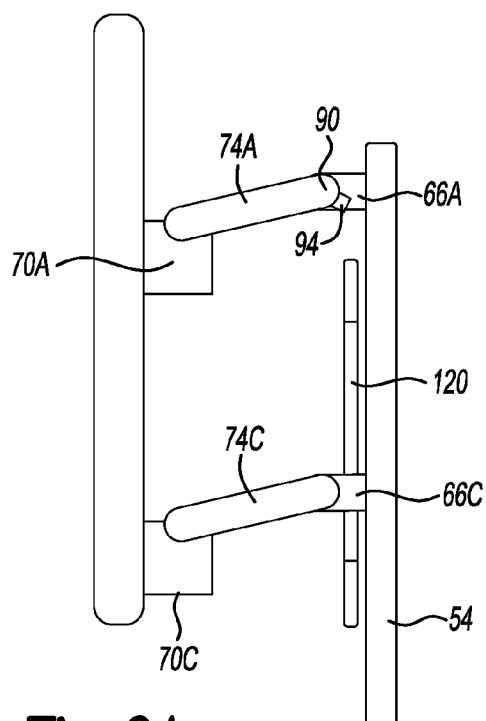
FIG. 9A is a side schematic view of the head restraint assembly of FIGS. 6-9 in the fully deployed position.

Referring to FIGS. 8 and 8A, as the links 74A, 74B rotate about axis A1, they cause the padded member 58 to move away from the plate 54. The movement of the padded member 58 as a result of the rotation of links 74A, 74B in turn causes the rotation of links 74C, 74D. Referring to FIGS. 9 and 9A, when the SMA wire 98A is its predetermined length, the padded member 58 is in a second position with respect to the plate 54, in which the padded member 58 is extended forward in the vehicle body and closer to an occupant than in the first position.

A one-way clutch is preferably employed to permit deployment of the padded member 58 (i.e., movement from its first position to its second position) and prevent retraction of the padded member 58 (i.e., movement from its second position to its first position). Various clutch assemblies may be employed, such as a spring clutch, a roller or ball clutch, a sprag clutch, or a ratchet and pawl clutch. An exemplary clutch assembly for use with the head restraint assembly 34 is depicted in FIGS. 10-14.

Figure 10:
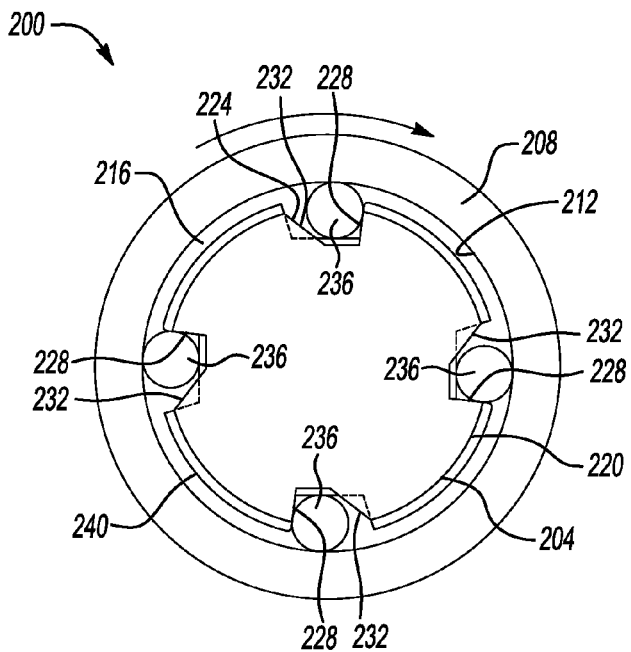
FIG. 10 is a schematic illustration of a clutch assembly used in the head restraint assembly of FIGS. 2-9A in a nominal position illustrating rotation of the clutch in a first direction.

Referring to FIG. 10, a clutch assembly 200 includes a stationary inner axle 204 and an annular outer ring 208. Ring 208 has an inner surface 212 that defines a cylindrical cavity 216. Axle 204 is positioned within the cavity 216 such that the outer surface 220 of the axle 204 opposes surface 212. Surface 220 is characterized by a plurality of chambers 224 that are open in the direction of surface 212. Each chamber 224 includes a surface 228 that extends radially, and a ramp surface 232.

Figure 11:
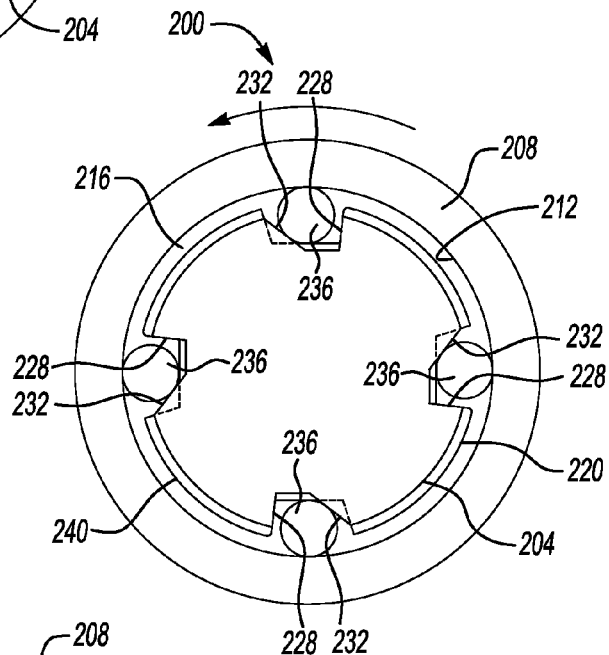
FIG. 11 is a schematic illustration of the clutch assembly used in the head restraint assembly of FIGS. 2-9A illustrating locking of the clutch in a second direction.

Each chamber 224 contains a respective roller or ball 236. When the outer ring 208 rotates in a first direction, each roller 236 is urged against a respective one of surfaces 228, and rotation of the ring 208 in the first direction is permitted, as shown in FIG. 10. Rotation of the outer ring in a second direction causes each roller 236 to roll up a respective ramp surface 232, urging the rollers 236 into wedging engagement with the outer ring 208 so that rotation of the ring 208 in the second direction is prevented, as shown in FIG. 11. The clutch assembly 200 includes a reset disk 240 configured to force, and potentially hold, the rollers 236 out of wedging engagement with the ring 208.

Figure 12:
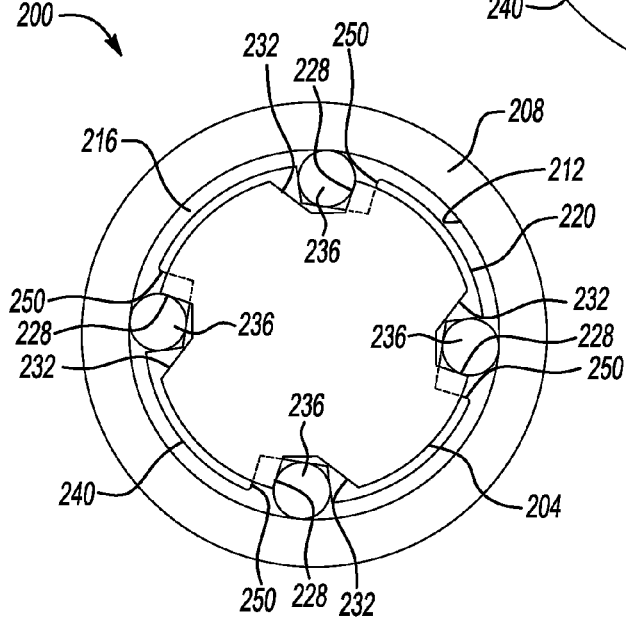
FIG. 12 is a schematic illustration of the clutch assembly used in the head restraint assembly of FIG. 2-9A in a rotated second position.

Reset disk 240 is rotatably mounted with respect to the inner axle 204, and includes a plurality of chambers 244. Each chamber 244 is aligned with a respective one of chambers 224. Each chamber 244 includes a radially oriented surface 250. When the reset disk 240 is in a first position, each radially oriented surface 250 is positioned so as not to interfere with the ability of the rollers 236 to engage the ramp surfaces 232. When the reset disk 240 is rotated to a second position, as shown in FIG. 12, surfaces 250 act on rollers 236, forcing the rollers out of engagement with the ramp surfaces 232, and thereby resetting the clutch assembly and allowing rotary motion of the assembly in either direction.

Figure 13:
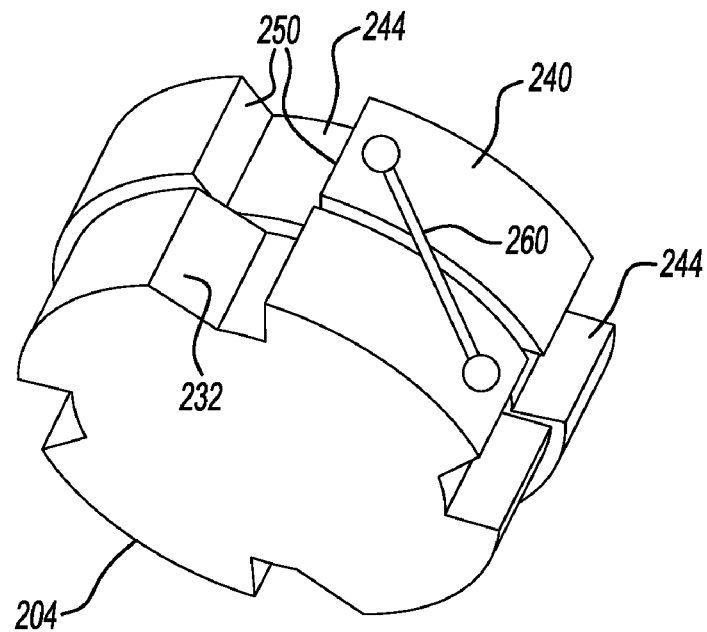
FIG. 13 is a schematic illustration of the clutch assembly used in the head restraint assembly of FIGS. 2-9A in the nominal position of FIG. 10 illustrating connection of the clutch with the active material member.
Figure 14:
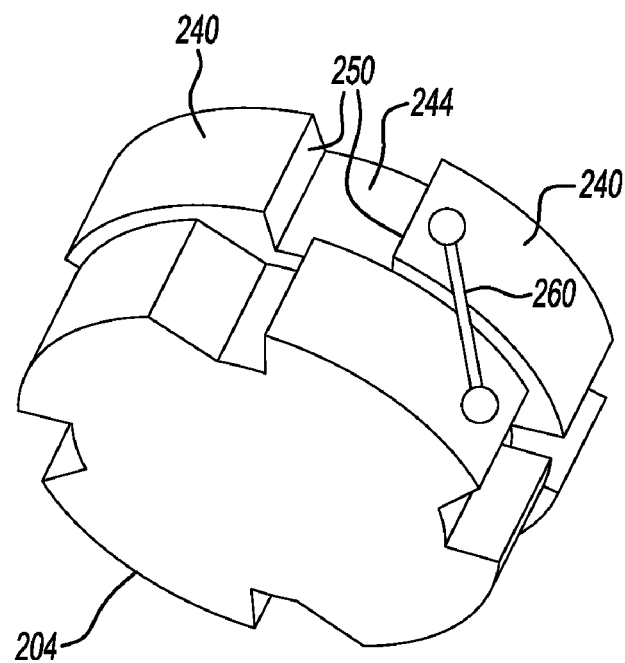
FIG. 14 is a schematic illustration of the clutch assembly used in the head restraint assembly of FIG. 2-9A in the rotated second position of FIG. 12 illustrating connection of the clutch with the active material member.

Referring to FIGS. 13 and 14, at least one SMA wire 260 interconnects the reset disk 240 and the inner axle 204. When the reset disk 240 is in its first position, the SMA wire 260 is longer than its predetermined length, as shown in FIG. 13. Heating the SMA wire 260 to its hot state causes the SMA wire 260 to decrease in length, causing the rotation of the reset disk 240 relative to the inner axle 204 to its second position, as shown in FIG. 14. Inner axle 204 may, for example, be mounted with respect to the plate 54, and ring 208 may be connected to shaft 90 for rotation therewith.

Referring to FIGS. 15-19, another clutch assembly 300 is schematically depicted. The clutch assembly 300 includes a rod 301, a movable member 302, and a plate 304 with a hole (not shown) formed therein. The plate 304 is pivotably connected to member 302, potentially spring loaded in a canted orientation (spring not shown), and is operatively connected to the member 302 via an SMA wire 306. The rod 301 extends through the hole in the plate 304, which is mounted at an angle preserved by the wire 306. The hole in the tilted plate 304 allows for the member 302 to slide freely up the rod 301, as shown in FIG. 16. When the member 302 is loaded in the downward direction, as shown in FIG. 17, the spring preload, coupled with friction on the rod 301, helps to further lift and rotate the plate 304 so that it positively locks on to the rod 301, restricting any downward motion of the plate 304 and the member 302. The clutch assembly 300 can be returned to its original position by heating the wire 306 to its hot state so that it decreases in length, as shown in FIG. 18, thereby rotating the plate 304 to allow the plate 306 and the member 302 to slide back down the rod 301, as shown in FIG. 19. Rod 301 may, for example, be mounted with respect to the plate 54, and the member 302 may be operatively connected to the member 58.

It may be desirable to include a lock which limits motion of the padded member 58 in both directions. A lock system such as this may be disengaged by an active material during actuation of the deployment mechanism and maintain a positive lock during all other phases of operation (save reset of the device). Such an active lock could be implemented in a number of ways, including wave spring locks, torsion spring locks, and friction couplings.

The active head restraint system may be configured to be automatically reset, with one or more of the following functions: (1) a separate SMA actuator to reset the system to its original configuration; (2) a return spring to reset the system to its original configuration; and (3) an active lock which can be released on demand. Automatic reset would entail first disengaging the one-way clutch or other locking device and keeping it disengaged via an active material actuator or similar device. The head restraint would then be returned to its original position via the second SMA actuator which is configured to return the head restraint to its original position or by a passive means like a return spring. Once in its nominal position the lock mechanism can be returned to its default configuration as well.

A reset system containing all of the above features could also be used for a comfort adjust feature of the head restraint with a user input to slowly reposition the head restraint. Such a system may use an active two-way locking device as well as a deploying and a stowing actuator. The two-way lock would be nominally in the hold position. Input from the occupant would disengage this lock before any adjustment takes place and the lock would be kept in this state throughout the adjustment process. Then, the position could be adjusted by actuating the deploying actuator to move the head restraint forward or actuating the stowing actuator to move the head restraint rearward. Once positioning is complete, the lock would be re-engaged, holding that position. The system could be controlled manually using an occupant interface or automatically, allowing an automated control system to position the head restraint in a factory preset location or a user defined preset location.

The head restraint system may be designed to clip onto a standard head restraint post bent into a "U" shape. As long as post spacing and diameter are constant, the same unit can be clipped onto different posts with different heights. This enables the active head restraint unit to be added or removed to a wide range of vehicle platforms with little to no change in other vehicle systems.

The SMA driven active head restraint system can be powered by a number of techniques, including, for example, direct power from the vehicle electrical system; a separate, dedicated battery for the head restraint system; and a rechargeable capacitor which could be charged by the vehicle's electrical system, kept ready for deployment during vehicle operation, then discharged when not in use.

The head restraint can be activated by a number of different systems, including pre-impact detection systems existing within the vehicle, where the SMA head restraint can be deployed if a rear impact is deemed eminent; impact detection systems existing within the vehicle, where the SMA head restraint can be deployed once a rear impact has occurred; and a dedicated impact detection system within the seat assembly, where a seat mounted accelerometer and seat mounted contact sensors can be used to trigger deployment if the sensors indicate a rear impact.

It may be desirable to employ springs to accommodate the deformation of a SMA wire in the event that the padded member 58 is obstructed during movement from its first position to its second position. Heating of a SMA wire is preferably accomplished by electrical resistance heating.

Shape memory alloy wires are employed in the embodiments herein. However, other active materials may be employed within the scope of the claimed invention. For example, other shape memory materials may be employed. Shape memory materials, a class of active materials, also sometimes referred to as smart materials, refer to materials or compositions that have the ability to remember their original shape, which can subsequently be recalled by applying an external stimulus (i.e., an activation signal). Thus, deformation of a shape memory material from its original shape can be a temporary condition.

Exemplary shape memory materials include shape memory alloys (SMAs), electroactive polymers (EAPs) such as dielectric elastomers, ionic polymer metal composites (IPMC), piezoelectric polymers and shape memory polymers (SMPs), magnetic shape memory alloys (MSMA), shape memory ceramics (SMCs), baroplastics, piezoelectric ceramics, magnetorheological (MR) elastomers, composites of the foregoing shape memory materials with non-shape memory materials, and combinations comprising at least one of the foregoing shape memory materials. The EAPs, piezoceramics, baroplastics, and the like can be employed in a similar manner as the shape memory alloys described herein, as will be appreciated by those skilled in the art in view of this disclosure.

In the present disclosure, most embodiments include shape memory wires; however, shape memory materials and other active materials may be employed in a variety of other forms within the scope of the claimed invention, such as strips, sheets, slabs, foam, cellular and lattice structures, helical or tubular springs, braided cables, tubes or combinations comprising at least one of the forgoing forms can be employed in a similar manner as will be appreciated by those skilled in the art in view of this disclosure.

While the best modes for carrying out the invention have been described in detail, those familiar with the art to which this invention relates will recognize various alternative designs and embodiments for practicing the invention within the scope of the appended claims.

The invention claimed is:

1. A head restraint assembly for a seat comprising:
   a support member;
   a deployable member selectively movable between a retracted position and a deployed position; at least a portion of said deployable member being farther from the support member in the deployed position than in the retracted position;
   a latch system configured to selectively retain the deployable member in the retracted position and release the deployable member to the deployed position; and
   an active material member that is actuatable by an activation signal to release the latch system and thereby to release the deployable member;
   wherein actuation of the active material also causes the movement of the deployable member from the retracted position to the deployed position; and
   wherein the deployable member is configured to be reset to the retracted position via the latch system when the activation signal is removed.

2. The head restraint assembly of claim 1, wherein at least a portion of the deployable member is in a different angular orientation relative to the support member in the deployed position than in the retracted position.

3. The head restraint assembly of claim 1, wherein the active material member comprises at least one of a shape memory alloy, a ferromagnetic shape memory alloy, a shape memory polymer, a magnetorheological elastomer, an electrorheological elastomer, an electroactive polymer, and a piezoelectric material.

4. The head restraint assembly of claim 1, wherein the active material member is a wire.

5. The head restraint assembly of claim 1, wherein the active material is configured to be activated by an activation signal that comprises at least one of a thermal activation signal, an electric activation signal, a magnetic activation signal, a chemical activation signal, and a mechanical load.

6. The head restraint assembly of claim 5, further comprising an activation device configured to provide the activation signal to the active material.

7. The head restraint assembly of claim 1, wherein the active material member changes in at least one of shape, stiffness and a dimension in proportion to an applied external signal.

8. The head restraint assembly of claim 1, wherein actuation of the active material allows a stored potential energy device to aid the movement of the deployable member from the retracted position to the deployed position.

9. A head restraint assembly comprising:
   a support member;
   a deployable member selectively movable between a retracted position and a deployed position; at least a portion of said deployable member being farther from the support member in the deployed position than in the retracted position;
   a clutch operatively interconnecting the support member and the deployable member and configured for a first mode of operation in which the clutch permits movement of the deployable member toward its deployed position and prevents movement of the deployable member toward the retracted position, and a second mode of operation in which the clutch permits movement of the deployable member toward the retracted position; and
   an active material member that is actuatable by an activation signal to cause the clutch to operate in the second mode of operation;
   wherein the deployable member is configured to be reset to the refracted position when the clutch is returned to the second mode of operation.

10. The head restraint assembly of claim 9, wherein the active material member comprises at least one of a shape memory alloy, a ferromagnetic shape memory alloy, a shape memory polymer, a magnetorheological elastomer, an electrorheological elastomer, an electroactive polymer, and a piezoelectric material.

11. The head restraint assembly of claim 9, wherein the active material member is a wire.

12. The head restraint assembly of claim 9, wherein the active material is configured to be activated by an activation signal that comprises at least one of, a thermal activation signal, an electric activation signal, a magnetic activation signal, a chemical activation signal, and a mechanical load.

13. The head restraint assembly of claim 12, further comprising an activation device configured to provide the activation signal to the active material member.

14. The head restraint assembly of claim 9, wherein the active material member changes in at least one of shape, stiffness and a dimension in proportion to an applied external signal.

15. A head restraint assembly comprising:
a support member;
a deployable member selectively movable in first and second directions between a retracted position and a deployed position; said deployable member being at least one of farther from and in a different angular orientation relative to the support member in the deployed position than in the retracted position;
a deployment mechanism configured to move the deployable member from the retracted position to the deployed position upon actuation;
an active material member that is actuatable by an activation signal; and
a lock system configured to limit motion of the deployable member in both directions and disengagable by the active material during actuation of the deployment mechanism;
wherein the deployable member is configured to be reset to the retracted position via the lock system when the activation signal is removed.

16. The head restraint assembly of claim 15, wherein the active material member comprises at least one of a shape memory alloy, a ferromagnetic shape memory alloy, a shape memory polymer, a magnetorheological elastomer, an electrorheological elastomer, an electroactive polymer, and a piezoelectric material.

17. The head restraint assembly of claim 15, wherein the active material member is a wire.

18. The head restraint assembly of claim 15, wherein the active material is configured to be activated by an activation signal that comprises at least one of a thermal activation signal, an electric activation signal, a magnetic activation signal, a chemical activation signal, and a mechanical load.

19. The head restraint assembly of claim 18, further comprising an activation device configured to provide the activation signal to the active material.

20. The head restraint assembly of claim 15, wherein the active material member changes in at least one of shape, stiffness and a dimension in proportion to an applied external signal.

21. The head restraint assembly of claim 15, wherein actuation of the active material is also operable to cause the deployable mechanism to move the deployable member from the retracted position to the deployed position.

* * * * *